US012577138B2

(12) United States Patent
Dearn et al.

(10) Patent No.: US 12,577,138 B2
(45) Date of Patent: Mar. 17, 2026

(54) USING DAPHNIA FOR BIOREMEDIATION

(71) Applicant: DAPHNE WATER SOLUTIONS LIMITED, Birmingham (GB)

(72) Inventors: Karl David Dearn, Birmingham (GB); Luisa Orsini, Birmingham (GB)

(73) Assignee: DAPHNE WATER SOLUTIONS LIMITED, Birmingham (GB)

( * ) Notice: Subject to any disclaimer, the term of this patent is extended or adjusted under 35 U.S.C. 154(b) by 570 days.

(21) Appl. No.: 17/783,808

(22) PCT Filed: Dec. 9, 2020

(86) PCT No.: PCT/EP2020/085377
§ 371 (c)(1),
(2) Date: Jun. 9, 2022

(87) PCT Pub. No.: WO2021/116229
PCT Pub. Date: Jun. 17, 2021

(65) Prior Publication Data
US 2023/0041143 A1 Feb. 9, 2023

(30) Foreign Application Priority Data
Dec. 10, 2019 (GB) ...................................... 1918129

(51) Int. Cl.
*C02F 3/32* (2023.01)
*C02F 101/30* (2006.01)
(Continued)

(52) U.S. Cl.
CPC ........ *C02F 3/327* (2013.01); *C02F 2101/305* (2013.01); *C02F 2101/306* (2013.01);
(Continued)

(58) Field of Classification Search
None
See application file for complete search history.

(56) References Cited

U.S. PATENT DOCUMENTS

2014/0110352 A1* 4/2014 King ........................ C02F 1/505
222/173
2019/0308896 A1 10/2019 Minasyan

FOREIGN PATENT DOCUMENTS

CA 2615422 A1 7/2009
CN 104285890 A 1/2015
(Continued)

OTHER PUBLICATIONS

Turko et al., Rapid evolutionary loss of metal resistance revealed by hatching decades-old eggs, Evolution 70.2: 398-407 (Year: 2016).*
(Continued)

*Primary Examiner* — Peter Keyworth
(74) *Attorney, Agent, or Firm* — Myers Bigel, P.A.

(57) ABSTRACT

There is disclosed a method of improving water quality, the method comprising adding a pool of isolated *Daphnia* to a body of water such that the pool of isolated *Daphnia* is exposed to one or more contaminants which may be in the water. The pool of isolated *Daphnia* comprise *Daphnia* which have been resurrected from dormant *Daphnia*. The pool of isolated *Daphnia* are allowed to filter from the body of water at least a portion of said one or more contaminants to reduce the level of the one or more contaminants in the body of water. After a period of time, at least a portion of the *Daphnia* containing said one or more contaminants are removed from the body of water, thereby improving the water quality of the body of water.

6 Claims, 6 Drawing Sheets

Figure 1:
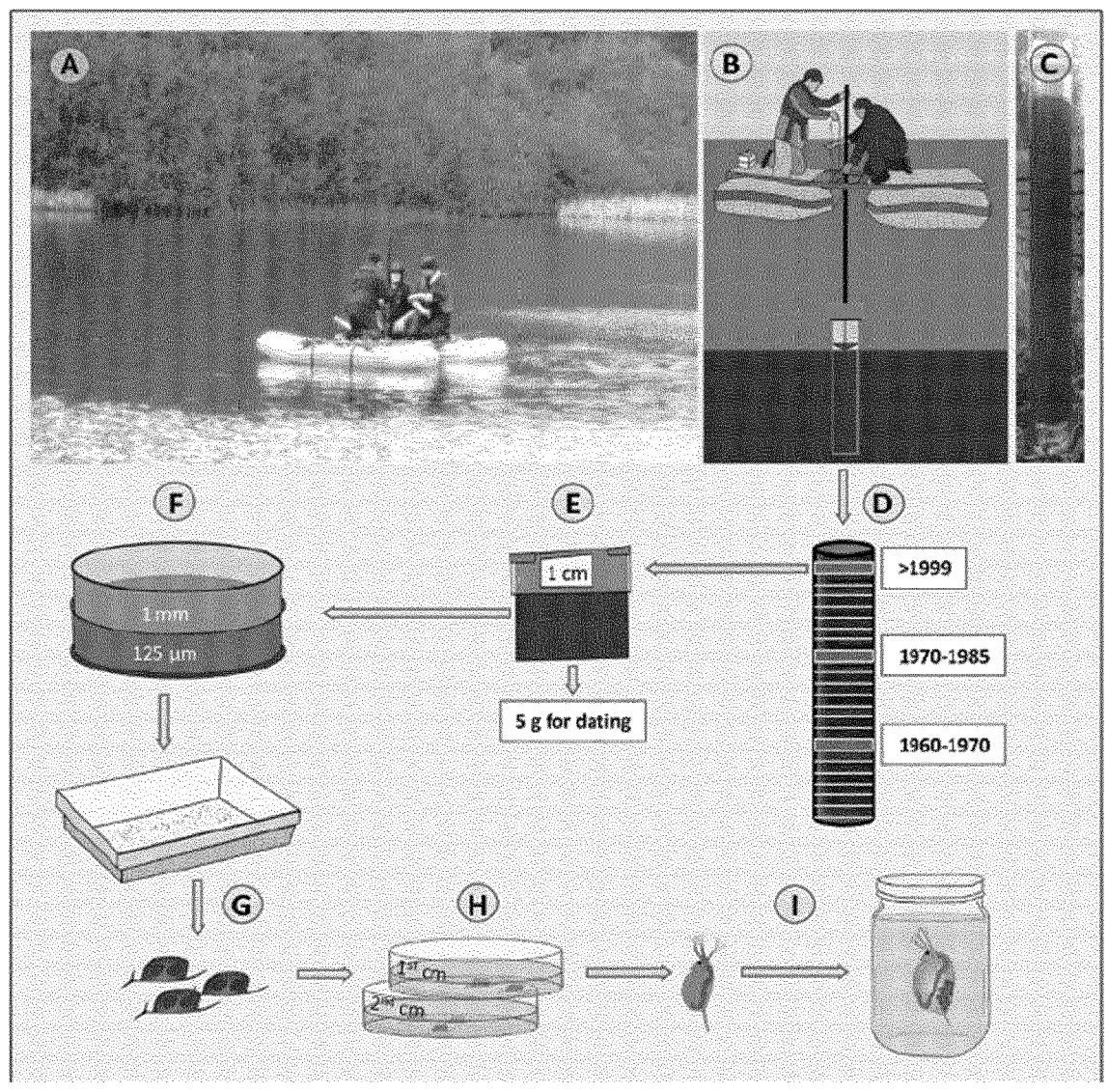

(51) Int. Cl.

| | |
|---|---|
| C02F 101/34 | (2006.01) |
| C02F 101/36 | (2006.01) |
| C02F 101/38 | (2006.01) |
| C02F 103/00 | (2006.01) |
| C02F 103/34 | (2006.01) |

(52) U.S. Cl.
CPC ...... *C02F 2101/34* (2013.01); *C02F 2101/36* (2013.01); *C02F 2101/38* (2013.01); *C02F 2103/007* (2013.01); *C02F 2103/343* (2013.01)

(56) References Cited

FOREIGN PATENT DOCUMENTS

| | | | |
|---|---|---|---|
| CN | 108439601 | A | 8/2018 |
| KR | 20140046578 | A | 4/2014 |
| NL | 9002231 | A | 5/1992 |
| NL | 1004813 | C2 | 6/1998 |
| WO | 9619108 | A1 | 6/1996 |

OTHER PUBLICATIONS

International Search Report corresponding to PCT/EP2020/085377; mailed Mar. 18, 2021 (5 pages).

Buser, Claudia C., et al., "Combined exposure to parasite and pesticide causes increased mortality in the water flea *Daphnia*", Aquatic Ecology. 46(2):261-268 (2012).

Navis, Sabine, et al., "Pesticide exposure impacts not only hatching of dormant eggs, but also hatchling survival and performance in the water flea *Daphnia magna*", Ecotoxicology. 22(5):803-814 (2013).

Sommer, Stefan, et al., "Demographic cost and mechanisms of adaptation to environmental stress in resurrected Daphnia", J. Limnol. 75(s2):30-35 (2016).

Zhang, Chao, et al., "Thermal evolution offsets the elevated toxicity of a contaminant under warming: A resurrection study in Daphnia magna", Evolutionary Applications. 11(8):1425-1436 (2018).

* cited by examiner

A

B

USING DAPHNIA FOR BIOREMEDIATION

FIELD

The present invention relates to a method of improving water quality using a pool of isolated *Daphnia* comprising *Daphnia* which have been resurrected from dormant *Daphnia*. Also provided are methods of generating or screening *Daphnia* for use in improving water quality, as well as water quality improvement devices for improving water quality, comprising *Daphnia*.

BACKGROUND

Pharmaceuticals are widely used in a range of applications, including human health conditions, farming, and agriculture. Their use has increased 65% from 2000 to 2015. Non-metabolized pharmaceuticals excreted via faeces or/and urine, as well as agricultural run-off and pharmaceutical industry waste contribute to pharmaceutical waste. Some of the primary constituents of this waste, which end up in municipal wastewater, are antibiotics, chemotherapy products, hormones, analgesics, antipyretics and antidepressants. The regulation of pharmaceutical removal from wastewater is expected in the near future, following the communication of the European Union Strategic Approach to Pharmaceuticals in the Environment.

Pesticides are the second most abundant category of chemicals present in the environment. For example, in 2016 almost 400,000 tonnes of pesticides were sold in Europe, with the vast majority used in the agricultural sector. According to the Water Framework Directive "pesticides are a cause of pollution and have a direct effect on the state of biodiversity, water bodies, and soils". Methods for pesticide removal from wastewater range from photocatalytic degradation to biological oxidation and nanofiltration and are, on average, more effective than the removal of pharmaceuticals. These methods are also energy consuming and require large infrastructure.

Commonly applied methods for treating wastewater only remove between 10 and 50% of chemical waste via volatilisation, and adsorption (adhesion of molecules of gas, liquid, or dissolved solids to a surface) by the activated sludge, whereas the vast majority escapes without biodegradation. At present, partial pharmaceutical removal may occur via photo-degradation or volatilization.

Due to the inefficient removal of contaminants such as pharmaceuticals and pesticides from wastewaters, many contaminants are found in effluent and surface waters at high concentrations, and many persist in the environment. Persistent contaminants are now a priority for the EU. Persistent organic pollutants (POPs) are toxic chemicals that adversely affect human health and the environment around the world, and include pesticides and pharmaceuticals. Following release in the environment, chemical waste is biomagnified over time and bioaccumulated through the food chain, with severe impact on human and wildlife. Examples of such impact on humans include: i) higher propensity to heart attacks, strokes and kidney failure associated with painkillers, ii) antibiotic resistance, which is associated with epidemics such as Ebola, pneumonia, tuberculosis, gonorrhoea, and *salmonellosis*; and iii) an increased risk of cancer. The impact upon wildlife includes disruption of sex determination (e.g. feminization of male fish by oestrogens); species extinction (e.g. diclofenac, a veterinary pharmaceutical widely used in farming, has been associated with the extinction of species which feed on dead livestock, such as vultures); fitness impact on wildlife (e.g. paracetamol, otherwise known as acetaminophen has a demonstrated adverse effect on aquatic life); antibiotic resistance which can disrupt ecosystem services (e.g. nutrient cycling, water purification) by negatively affecting microorganisms in farmland soil crucial for nitrogen fixation. In general, pesticides have been shown to have a negative impact on non-target species; for example, bee populations are thought to have been halved by pesticides. Another example is atrazine, a persistent pesticide considered by the Environmental Protection Agency (EPA) to be among the most serious hazardous substances for human health, especially via prenatal exposure. The pesticide glyphosate, known commercially as Roundup, is one of the most debated herbicides in modern times, allegedly associated with cancer, non-Hodgkin's lymphoma and tumorigenesis.

Chemical pollution has been acknowledged by the European Commission as an environmental problem. Although legislative measures to limit the impact of chemicals, namely pesticides, on human and environmental health are in force in Europe, pharmaceuticals are not regulated and there remains a need for improved wastewater treatment.

It is amongst the objects of the present invention to obviate and/or mitigate at least one of the aforementioned disadvantages.

DESCRIPTION

According to a first aspect there is provided a method of improving water quality, the method comprising: adding a pool of isolated *Daphnia* to a body of water such that the pool of isolated *Daphnia* is exposed to one or more contaminants which may be in the water; allowing the pool of isolated *Daphnia* to filter from the body of water at least a portion of said one or more contaminants to reduce the level of the one or more contaminants in the sample of water; and after a period of time, removing at least a portion of the *Daphnia* containing said one or more contaminants, from the body of water; thereby improving the water quality of the sample of water. The pool of isolated *Daphnia* comprises *Daphnia* which have been resurrected from dormant *Daphnia*, for example, dormant embryos or dormant eggs.

*Daphnia* are a genus of small planktonic crustaceans which are found in various aquatic environments ranging from acidic swamps and brackish water to freshwater lakes and ponds.

In a particular embodiment, the pool of isolated *Daphnia* has been obtained from, or comprises *Daphnia* which have been resurrected from samples of dormant *Daphnia* obtained from, a polluted water source, such as from a polluted natural body of water, such as a lake, or lake which was historically polluted. The dormant *Daphnia* will generally be obtained from sediment found at the bottom of the body of water. As will be appreciated, the bottom of any natural body of water is constantly evolving and sediment builds up over time. Thus, in terms of taking a sediment core sample, the greater the depth from which the sample is obtained, the older the sample is. It is also possible to date when a particular core sample has been obtained from, and dormant *Daphnia* for resurrection may be obtained from periods which were known previously to have been at times of pollution or just before pollution occurred, for example. The present inventor has found that dormant *Daphnia* which are obtained and resurrected from a known period of exposure to sewage but predating major chemical pollution, may find particular application in the present invention, in terms of being capable of filtering said one or more contaminants from a body of water.

The term "resurrected", as used herein, and as explained in greater detail in the detailed description, relates to the hatching of dormant *Daphnia* embryos or dormant *Daphnia* eggs. Dormant eggs can and have been obtained over time, these eggs being stored in an egg bank to form a sedimentary archive or a biological archive. Thus, the samples of *Daphnia* obtained from sediment at the bottom of a body of water may comprise or consist of dormant *Daphnia* eggs which may be stored in an egg bank following earlier harvesting from a polluted water source. The harvesting may have been decades previously.

One such suitable (of many suitable) polluted water source is Lake Ring in Denmark. Thus, the pool of isolated *Daphnia* may comprise *Daphnia*, or dormant embryos or dormant eggs thereof, obtained from Lake Ring in Denmark.

The pool of isolated *Daphnia* may comprise *Daphnia* resurrected from dormant *Daphnia* eggs obtained from biological archives predating high levels of chemical pollution (e.g. <1960s) from pesticides and pharmaceuticals. Thus, the inventors believe that any *Daphnia* resurrected from dormant eggs obtained in the year prior to 1960 are especially resistant to high levels of chemical pollution and capable of absorbing and retaining, and concentrating, one or more contaminants. Modern strains of *Daphnia*, such as those dormant since 1980, 1999 or later, or those active today, have been exposed to major chemical pollution, and have been found to be less effective at surviving in, and removing contaminants from, wastewater than strains dormant since before major chemical pollution, such as strains from 1960, or earlier, as shown in Examples 2 and 7.

In the context of the present invention, the filtration of the body of water by the pool of isolated *Daphnia* will be understood to refer to the ingestion of at least a portion of one of more contaminants from the body of water by the pool of isolated *Daphnia*. It will be appreciated that filtration by the *Daphnia* can occur over a period of time, after the addition of the pool of isolated *Daphnia* to the body of water.

In the context of the present invention it is necessary to remove some or all of the *Daphnia* after a period of time, once filtering of said one or more contaminants has taken place. Removal of at least a portion of said *Daphnia* is important, otherwise the *Daphnia* will die, leading to decay, which will lead to said one or more contaminants being released back into the body of water. Conveniently, the pool of isolated *Daphnia* added to the body of water will be substantially viable. "Viable", in the context of the present invention, refers to living *Daphnia* or *Daphnia* capable of living (i.e. *Daphnia* produced as a result of clonal reproduction). It will be appreciated that the pool of *Daphnia* may comprise a portion of dead or non-viable *Daphnia*, but such dead or non-viable *Daphnia* are not expected to have a material effect on the method and will not contribute to the method of improving water quality.

The inventor has found that the pool of isolated *Daphnia* can remain viable at a surprisingly high level of one or more contaminants, for example in wastewater. This ensures that the pool of isolated *Daphnia* can filter a substantial proportion, of one or more contaminants from the sample of water.

An average lifespan of an adult *Daphnia* may be approximately one, two or three months. As the skilled person will appreciate, after being added to the sample of water (and filtration commences), at least some of the isolated *Daphnia* will die and such dead *Daphnia* may release said one or more contaminants back into the water Thus, in a further embodiment, the present invention further comprises removing at least a portion of any dead and/or dying *Daphnia* after a period of time, or at regular time intervals. This serves to ensure that such dead and/or dying *Daphnia* which may have filtered said one or more contaminants, are removed from the body of water before they release said contaminant(s) back into the body of water through natural decay following death.

Non-viable or dead adult *Daphnia* can be distinguished from viable adult *Daphnia* by their swimming behaviour. Viable adult *Daphnia* freely move (swim) in a sample of water. In contrast, non-viable adult *Daphnia* do not swim and sink to the bottom of a water sample. Thus, it may be relatively easy to remove any non-viable or dead *Daphnia* from the sample of water by, for example, capturing said non-viable or dead *Daphnia* by use of a trap or net, for example, into which the non-viable/dead *Daphnia* sink.

The *Daphnia* are not selective filter feeders, hence non-selective about the type of contaminant they will filter. They are capable of filtering many types of contaminant, such as chemicals, pharmaceuticals, pesticides, suspended solids and/or excess nutrients, for example phosphorus and/or nitrogen. This advantageously ensures that the *Daphnia* improve the water quality by removing various types of contaminant rather than just one type, for example, pharmaceuticals or pesticides, and including persistent contaminants such as POPs.

Conveniently, the present method does not require large or complex infrastructure such as turbines or heavier machinery. The method of the present invention is thus low cost and has only low infrastructure requirements. This may be of particular benefit to decentralized regions for which large infrastructure used in typical wastewater treatment is not suitable. In addition, this is of particular benefit to regions having developing economies.

Since the present method requires only limited infrastructure, this also reduces the production of secondary waste.

Advantageously, the method of the present invention also does not require a constant energy supply. This conveniently provides a low energy intensity method.

Removal of at least a portion the pool of *Daphnia*, optionally including at least a portion of any non-viable and/or dead *Daphnia*, is conducted after a period of time, such as after one week, two weeks, three weeks or longer of the pool of isolated *Daphnia* being in the sample of water. The pool of *Daphnia* and the non-viable and/or dead *Daphnia* may be removed at the same time or different times or time intervals. There may be a plurality of removal steps. The plurality of removal steps may be at regular time intervals. The step of removing at least a portion of the *Daphnia* and/or at least a portion of the non-viable and/or dead *Daphnia* may occur two, three, four or more times. For example, removal may occur once every, once a week, once a fortnight or once a month, for example.

It may be appropriate to replace/replenish any removed *Daphnia* with further *Daphnia*. In this manner, the total pool of *Daphnia* may be maintained, even when some of the pool of *Daphnia* are removed. Nevertheless, the pool of *Daphnia* is to some extent self-sustaining because *Daphnia* reproduce clonally and each animal produces 15-35 copies of itself every 3 days after reaching sexual maturity.

By "remove", this will be understood to refer to either taking the *Daphnia* out of the sample of water, or moving the sample of water away from the *Daphnia*, such that the location of the *Daphnia* is different to the original body of water. In embodiments, removal of the *Daphnia* is taking the *Daphnia* out of the body of water.

Changing the location of the *Daphnia* and the body of water, relative to one another, after the pool of isolated *Daphnia* have filtered the one or more contaminants, ensures that the body of water is free of at least a portion, optionally all of, the pool of isolated *Daphnia* such that the body of water is then ready for further use.

In embodiments, allowing the pool of isolated *Daphnia* to filter from the body of water comprises allowing the pool of isolated *Daphnia* to absorb and retain at least a portion of said one or more contaminants, or metabolites thereof from the body of water.

By "absorb and retain", this will be understood to mean that the *Daphnia* takes in at least a portion of said one or more contaminants, and holds onto the said one or more contaminants for at least a period of time, such that the one or more contaminants is/are in the *Daphnia* for at least the period of time rather than in the body of water, thereby removing at least a portion of said one or more contaminants from the body of water and improving the water quality. The *Daphnia* may retain the one or more contaminants indefinitely. In some embodiments, the *Daphnia* retain the one or more contaminants while the *Daphnia* is/are viable. Once non-viable or dead, the *Daphnia* may retain the one or more contaminants for a limited period of time, for example, for a further six, 12, 18, 24, 48 or 72 hours. Hence, in some embodiments, the non-viable and/or dead *Daphnia* are removed at regular time intervals. In embodiments, substantially all of any non-viable and/or dead *Daphnia* (at a given time point) are removed from the pool of isolated *Daphnia*.

The pool of isolated *Daphnia* retaining at least a portion of said one or more contaminants from the sample of water may comprise the pool of isolated *Daphnia* metabolising at least a portion of said one or more contaminants. The metabolism of at least a portion of the one or more contaminants may convert the one or more contaminants into non-toxic metabolites, which do not detrimentally affect water quality. This product may be released by the *Daphnia* into the body of water.

Water quality defines the chemical, physical, biological and radiological characteristics of water. It is a measure of the condition of the water relative to an intended purpose for the water, whether this be for safe industrial and/or domestic use or as environmental water (i.e. water in a pond or lake).

There are various internationally recognised standards for water quality, of which the skilled person will be aware. One such standard is the International Organization for Standardization (ISO) regulation of water quality in section 13.060. This section includes standards for water sampling, industrial class water, sewage, and examination of water for chemical, physical or biological properties. ICS 91.140.60 covers the standards of water supply systems. In the European Union, the Council Directive 91/271/EEC of 21 May 1991 details the standards for urban waste water treatment, urban waste water being defined in the Directive as domestic waste water or a mixture of domestic waste water with industrial waste water and/or run-off rain water.

As the skilled reader will appreciate, the nature and form of water quality may vary between countries and regions. Thus, for the purposes of the present invention, "improving water quality", will be understood to mean that the water is more suitable (than prior to the method) for safe industrial and/or domestic use and/or for addition to the environment as environmental water.

By "more suitable", this may include that the water is suitable for industrial and/or domestic use and/or for addition to the environment as environmental water. It will be appreciated that "more suitable" does not necessarily mean that the water is suitable for industrial and/or domestic use and/or for addition to the environment as environmental water (which is included herein in this definition), but (or alternatively) that the water is closer to the appropriate standard of quality for a particular country or region for one or more of the above-mentioned intended purposes, than the water was prior to the method.

Improving water quality will thus be understood to refer to a reduction in the level of one or more contaminants in the body of water (relative to the body of water prior to the addition of the pool of the isolated *Daphnia*), particularly persistent contaminants, POPs, pesticides and/or pharmaceuticals. Measures of improved water quality may include one or more of a reduction in biochemical oxygen demand, a reduction in chemical oxygen demand, a reduction in suspended solids, and/or a reduction in phosphates. An improved water quality may also be determined by removal of one or more chemicals. It may also be determined by an increase in oxygen content, a reduction in nitrates, a reduction in nitrogen (or ammonia) and/or a change in pH, optionally an increase in pH.

It will be appreciated that a reduction in biochemical oxygen demand and/or chemical oxygen demand can be indicative of a reduction in bacterial load, including pathogenic bacteria, in a body of water.

Suspended solids refer to small solid particles, i.e. organic matter which remains in suspension in water as a colloid or due to the motion of the water. Suspended solids may comprise organic particles, microorganisms, for example one or more of fungi and bacteria. Suspended solids may comprise algae.

Established methods for determining the level of total nitrogen, ammonia, nitrate and/or total phosphorus in a body of water are available in the HACH manual (HACH (2013) DR/820/DR850/DR890 Wastewater and Biosolids Analysis Manual). Alternative methods for determining the level of nitrogen, ammonia, nitrate and/or total phosphorus in a body of water are available and are hereby incorporated by reference in WFD: The EU Commission (2000): The EU Water Framework Directive. OJL 327: 1-73; ISBN 978-92-79-36449-5

An improved water quality may be determined as a change in pH, optionally a change in pH to a pH of between 6 and 8.5, optionally of between 6.5 and 8.5, optionally 7.

The European Council Directive 91/271/EEC of 21 May 1991 states that discharges from urban waste water treatment plants should have a biochemical oxygen demand (BOD5 at 20° C.) without nitrification of 25 mg/l $O_2$, or alternatively a minimum percentage reduction of 40, 70 or 90% of biochemical oxygen demand relative to the water sample prior to the method. Thus, in some embodiments, an improved water quality may be understood to refer to a BOD5 at 20° C. without nitrification of 25 mg/l $O_2$ and/or a minimum percentage reduction of 40, 70 or 90% of biochemical oxygen demand.

To determine the biochemical oxygen demand, a homogenized, unfiltered, undecanted sample of the water (after the step of allowing the pool of isolated *Daphnia* to filter at least a portion of the one or more contaminants) can be incubated for five days at 20° C.±1° C. in complete darkness, optionally with the addition of a nitrification inhibitor. The dissolved oxygen can be measured before and after the five day incubation, and compared to the dissolved oxygen obtained for a control sample of the water also subjected to the same five day conditions but prior to addition of the pool of isolated *Daphnia*.

In some embodiments, an improved water quality comprises the body of water (after the step of allowing the pool of isolated *Daphnia* to absorb and retain the one or more contaminants) having a chemical oxygen demand of 125 mg/l O$_2$ or a minimum chemical oxygen demand (COD) percentage reduction of 75% relative to the body of water prior to the method. An established method for determining the chemical oxygen demand is to add potassium dichromate to a homogenized, unfiltered and undecanted body of the water.

To determine the COD, a sample of the water (after the step of allowing the pool of isolated *Daphnia* to filter at least a portion of the one or more contaminants) can be placed into a vial and inverted several times, then placed inside a preheated COD reactor at 150° C. for two hours. The vial can then be removed after cooling to 120° C. or less, inverted a further several times then cooled to room temperature. A HACH 200 colorimeter can then be used to determine the COD. The procedure can be carried out using a vial of deionised water to act as a control. Further information on how to determine the COD is available in the art using the HACH manual (HACH (2013) DR/820/DR850/DR890 Wastewater and Biosolids Analysis Manual).

In embodiments, an improved water quality comprises the body of water having no more than 60 mg/l, optionally no more than 35 mg/l of total suspended solids. Alternatively, or in addition to, an improved water quality may comprise the body of water having at least a 70%, optionally at least a 90% reduction in the total suspended solids relative to the body of water prior to the method.

An established method for determining the total suspended solids in a sample is to filter a representative sample through a 0.45 µm filter membrane. This is then dried at 105° C. and weighed. Alternatively, a representative sample can be centrifuged for at least five minutes with a mean acceleration of 2800 to 3200 g, the centrifuged pellet dried at 105° C. and then weighed. Alternatively, the total suspended solids in a sample can be determined using the HACH photometric method, which is known in the art and is available in the HACH manual (HACH (2013) DR/820/DR850/DR890 Wastewater and Biosolids Analysis Manual).

Following treatment of the body of water using *Daphnia* in accordance with the present invention, the body of water may be subjected to one or more treatment steps, which are commonly used in treating water. Thereafter the water may be suitable for a variety of uses including agricultural uses and/or for use in animal or human drinking water.

In the context of the present invention, an improved water quality comprises the body of water having a reduced level of the one or more contaminants following the method, relative to the body of water prior to the method or before the addition of the pool of isolated *Daphnia*. The pool of isolated *Daphnia* may filter at least 10%, at least 20%, at least 30%, at least 40%, at least 50%, at least 60%, at least 70%, at least 80%, at least 90% or at least 95% of one or more of the contaminants from the body of water to improve the water quality.

In embodiments, the pool of isolated *Daphnia* may filter between at least 10% and 80% of one or more of the contaminants from the body of water. In embodiments, the pool of isolated *Daphnia* may filter between at least 10% and 70% of one or more of the contaminants from the body of water, optionally between at least 50% and at least 70% of one or more of the contaminants from the body of water.

The pool of isolated *Daphnia* may filter at least 50% of one or more of the contaminants from the body of water to improve the water quality. For example, the pool of isolated

*Daphnia* may filter approximately 65% of one or more of the contaminants from the body of water.

In embodiments, the pool of isolated *Daphnia* filters at least 10% of one or more contaminants from the body of water during one day. The pool of isolated *Daphnia* may filter at least 20%, at least 30%, at least 40%, at least 50% or at least 60% of one or more contaminants from the body of water during one day. The ability of the *Daphnia* to reduce the level of the one or more contaminants from the body of water during only one day means that the present invention is particularly efficient and, therefore, suitable for the treatment of large-scale volumes of water, for example, water processed at a municipal waste plant.

The pool of isolated *Daphnia* may filter at least 50% of one or more contaminants from the body of water in under three days. In some embodiments, the pool of isolated *Daphnia* filter 100% of one or more contaminants from the body of water during three days. This is especially effective.

In embodiments, the pool of isolated *Daphnia* filters at least 50%, optionally at least 60 or 65% of one or more contaminants from the body of water during three days.

In the context of the present invention, "pool of *Daphnia*", will be understood to refer to a plurality of *Daphnia*. Thus, the phrase "pool of isolated *Daphnia*" may otherwise be referred to as "plurality of isolated *Daphnia*". Preferably, the population is a population of adult *Daphnia*. The plurality may be at least 100, at least 120, at least 140, at least 160 or at least 200 *Daphnia* per litre of the body of water. In embodiments no more than 300, 250, 200, or 160 *Daphnia* may be added per litre of the body of water. In embodiments, at least 100 and no more than 200 *Daphnia* may be added per litre of the body of water, for example 120 *Daphnia* per litre.

By "isolated *Daphnia*", this will be understood to define *Daphnia* which are not in their natural habitat, i.e. a swamp, lake or pond—they have been taken from this environment, or are derived from *Daphnia* taken from this environment. Isolated *Daphnia* also include *Daphnia* which were dormant and have been resurrected from the environment from which they were found. Such dormant *Daphnia* may be obtained from sediment samples obtained from the bottom of natural bodies of water, such as lakes, ponds and the like. Thus, the method of the present invention is an industrial method rather than a natural method.

The term "body of water", as used herein, may be understood to refer to water which includes both environmental and non-environmental bodies of water—environmental water being a water body such as a lake, river or pond. The method may be carried out on the natural body of water, such as a lake, river or pond, but also includes a volume of water taken from one or more such natural environmental bodies of water.

In embodiments, the body of water comprises environmental water, for example a lake, river, stream, pond or swamp.

The body of water also includes non-environmental bodies of water. For example, the body of water may be in a bioreactor, or tank which may contain a wastewater to be treated in accordance with the present invention. As the skilled person will appreciate, a bioreactor is a manufactured vessel or system for holding liquid, in the present invention, this being the body of water. The bioreactor may be capable of holding at least 15 L of water. In embodiments, the bioreactor is capable of holding at least 100 L of water. The bioreactor may be capable of holding at least 200 or at least 300 L of water.

In embodiments, the body of water comprises wastewater. The wastewater may comprise run-off rainwater, household waste and/or industrial wastewater. It will be appreciated that wastewater is water that has been used, whether in the home, in a business, as part of an industrial process, or as run-off rain water from agricultural land. Since the wastewater has been used (or potentially contaminated with products used, as in the case of the run-off rainwater), it is not sterile, and so it will be appreciated that the wastewater will contain suspended solids comprising or consisting of bacteria.

The wastewater may be municipal wastewater. Municipal wastewater is wastewater containing primarily household sewage, agricultural run-off, road run-off and small industrial establishment's wastewater. The method may thus be carried out in a sewage treatment plant, although other locations can be envisaged.

The level of the one or more contaminants in the body of water may be assessed before and after addition of the pool of isolated *Daphnia* to confirm that the level of the one or more contaminants in the body of water is reduced after addition of the pool of the isolated *Daphnia* to the body of water. Assessment after addition of the pool of isolated *Daphnia* may be after removal of at least a portion of any non-viable *Daphnia* from the pool of isolated *Daphnia*.

The *Daphnia* may be exposed to a plurality of contaminants (i.e. more than one contaminant), for example two, three, four, five, six, seven, eight, nine, ten or more contaminants.

When the *Daphnia* are exposed to a plurality of contaminants, the *Daphnia* may filter at least a portion of said one or more of the contaminants. For example, the *Daphnia* may be exposed to two contaminants, and may filter at least a portion of both contaminants, or at least a portion of only one of the contaminants.

In embodiments, the *Daphnia* are exposed to a plurality of contaminants and filter at least a portion of each of the plurality of contaminants.

In the context of the present invention, the term "level" refers to a quantity and/or concentration of the one or more contaminants. Assessment may comprise mass spectrometry.

Without wishing to be bound by theory, prior to the present invention, the present inventors believed that *Daphnia* would not be able to survive and thrive in samples of water, for example, wastewater, containing one or more contaminants. Yet, entirely surprisingly, a pool of isolated *Daphnia* can survive in a body of water comprising one or more contaminants, and can even reproduce in such water.

The pool of isolated *Daphnia* may be kept in the body of water for no more than one month, two months or three months. In some embodiments, the pool of *Daphnia* may be kept in the body of water indefinitely because *Daphnia* reproduce clones of itself, or until all of said one or more contaminants have been removed from the body of water, providing said viable *Daphnia* and/or non-viable/dead *Daphnia* are removed at intervals as described above.

It will be appreciated that at least some of the pool of isolated *Daphnia* will die and so become non-viable during their duration in the body of water. Hence, the duration in the body of water will be calculated from the addition of the initial pool of isolated *Daphnia* to the body of water. Although some of the *Daphnia* may die, due to clonal reproduction by the *Daphnia* the number of viable *Daphnia* in the pool of isolated *Daphnia* in the body of water may typically remain at a similar number to that of the original pool of isolated *Daphnia* when added to the body of water.

Reproduction by the *Daphnia* may be asexual (which may otherwise be referred to as clonal) or sexual.

Viable adult *Daphnia* are capable of clonally reproducing every three days after reaching sexual maturity (generally between 4 and 6 days from birth). Due to the ability of the pool of isolated *Daphnia* to clonally reproduce, this ensures that the pool of isolated (and live) *Daphnia* is replenished regularly. Thus, the method may be self-sustaining and in embodiments may not require the further addition of fresh viable *Daphnia*. In addition, the ability to clonally reproduce ensures that the genetic signature of the pool of isolated *Daphnia* remains constant, thereby ensuring a consistent level of filtration from the pool regardless of the duration of time it is kept in the body of water.

At least 90% of the pool of isolated *Daphnia* added to the water may remain viable after one month in the sample of water.

In embodiments, the pool of isolated *Daphnia* is kept in the body of water for an extended period of at least a few weeks, up to 3 months.

In embodiments, the population of isolated *Daphnia* is kept in the body of water for a period of at least one day.

The one or more contaminants may comprise one or more persistent contaminants, such as POPs. Removal of persistent contaminants from water has become a priority for the EU.

The one or more contaminants may comprise one or more pharmaceutical product(s), pesticide(s), fertilizer(s), perfluorinated compound(s), fluorosurfactant(s) and/or suspended solids. Optionally, the one or more contaminants may comprise one or more pharmaceutical product(s), pesticide(s), and/or suspended solids.

A pharmaceutical agent will be understood to mean an agent for therapeutic or prophylactic use. In use, the pharmaceutical agent would be administered to a patient. Such pharmaceutical agents may pass through a patient's digestive system, entering wastewater via urine or faeces. Thus, in the context of the present invention, the term pharmaceutical agent also includes metabolites or other side-products generated from or derived from the pharmaceutical agent after administration to a patient.

The patient may be mammalian or non-mammalian. Mammalian patients within the context of the present invention include, but are not limited to humans, horses, cattle, dogs, cats, goats, sheep and birds.

As used herein, "pesticide" refers to a chemical substance, biological agent (such as a virus or bacterium), antimicrobial, or disinfectant used against any pest. By "used against any pest", this means to deter, damage or kill a pest. Pests include insects, plant pathogens, weeds, molluscs, birds, mammals, fish, nematodes (roundworms), and microbes that destroy property, spread disease or are a vector for disease or cause a nuisance. However, preferably by "pesticide" we mean that the pest is any invertebrate animal that destroys property, particularly agricultural commodities.

Suspended solids may comprise microorganisms, including pathogenic bacteria, algae and small particulate residue from activate sludge. The microorganisms may comprise bacteria and fungi.

Various types of pharmaceutical agent are used worldwide. For example, the one or more pharmaceutical agent(s) may comprise one or more of an antibiotic, a chemotherapeutic agent, an anti-viral agent, a hormone, an analgesic, an antipyretic, an antiepileptic, an anti-diabetic agent, an anti-inflammatory agent, a cholesterol-lowering agent, disease modifying antirheumatic agent (DMARD), anti-migraine medication, blood thinning agent, sleeping medication and/or an antidepressant.

As the skilled person will appreciate, sometimes a type of pharmaceutical agent can fall under two or more different categories—for example an analgesic can also be an anti-inflammatory, for example, acetaminophen or ibuprofen.

The term "chemotherapy agent", as used herein, refers to any agent used for the treatment of cancer. Analgesics may be otherwise be referred to as painkillers.

The one or more pharmaceutical agent(s) may comprise one or more of an antibiotic, a chemotherapy agent, a hormone, an analgesic, an antipyretic, an antiepileptic, an anti-diabetic, cholesterol-lowering agent and/or an antidepressant.

In embodiments, the one or more pharmaceutical products comprises one or more of an analgesic, an antibiotic, an antiepileptic, an anti-diabetic agent and/or a cholesterol-lowering agent.

The antibiotic may comprise one or more of erythromycin, trimethoprim, amoxicillin, doxycycline, cephalexin, ciproflaxin, clindamycin, metronidazole, azithromycin and sulfamethoxazole. In embodiments, the antibiotic is selected from erythromycin and/or trimethoprim.

Various anti-epileptic agents are available commercially and are administered to patients. The anti-epileptic may comprise or consist of one or more of sodium valproate, carbamazepine, lamotrigine, levetiracetam, oxcarbazepine, ethosuximide, topiramate and gabapentin. In embodiments, the anti-epileptic is selected from carbamazepine and/or gabapentin.

The anti-diabetic agent may comprise one or more of metformin, sulflonylureas, meglitinides, thiazolidinediones, DPP-4 inhibitors, GLP-1 receptor agonists, SGLT2 inhibitors and insulin.

Exemplary sulfonylureas include, but are not limited to glyburide, glipizide and glimepiride. In embodiments, the anti-diabetic agent is selected from metformin and/or sulfonylureas, for example glyburide.

The meglitinides may comprise one or more of repaglinide and nateglinide. The thiazolidinediones may comprise one or more of rosiglitazone, pioglitazone.

DPP-4 inhibitors may include, but not necessarily be limited to sitagliptin, saxagliptin and linagliptin.

Exemplary GLP-1 receptor agonists include, but are not necessarily limited to, exenatide, liraglutide and semaglutide. Exemplary SGLT2 inhibitors include, but are not necessarily limited to, canagliflozin, dapagliflozin and empagliflozin.

The cholesterol-lowering agent may comprise one or more of a beta-blocker and a statin.

Exemplary beta-blockers include, but are not limited to propranolol, acebutolol, atenolol, bisoprolol, metoprolol, nadolol and nebivolol.

The statin may comprise of one or more of atorvastatin, fluvastatin, lovastatin, pitavastatin, pravastatin, rosuvastatin calcium and simvastatin.

In embodiments, the cholesterol-lowering agent may be selected from propranolol and/or a statin.

Analgesics fall into two categories; non-opioid analgesics and opioid analgesics. In embodiments, the one or more analgesic(s) may comprise non-opioid and opioid analgesic(s). In other embodiments, the one or more analgesic(s) consist of non-opioid analgesics. Alternatively, the analgesics may consist of opioid analgesics.

Examples of opioid analgesics include, but are not limited to, codeine, hydrocodone, hydromorphone, meperidine, methadone, morphine, oxycodone, oxymorphone, pentazocine, propoxyphene, tapentadol and tramadol.

Commercially available non-opioid analgesics include, but are not limited to, ibuprofen, acetaminophen (which may otherwise be referred to as paracetamol), aspirin, naproxen and diclofenac.

In embodiments, the one or more analgesic(s) are selected from one or more of codeine, hydrocodone, hydromorphone, meperidine, methadone, morphine, oxycodone, oxymorphone, pentazocine, propoxyphene, tapentadol, tramadol, ibuprofen, acetaminophen, aspirin, naproxen, diclofenac or a combination thereof.

In embodiments, the one or more analgesic(s) are selected from one or more of ibuprofen, aspirin, acetaminophen, diclofenac, tramadol, naproxen and codeine, or a combination thereof. The analgesic may be selected from one or more of acetaminophen, ibuprofen, naproxen, tramadol, or combinations thereof. In embodiments, the analgesic is selected from one or more of ibuprofen and acetaminophen. In some embodiments, the analgesic is acetaminophen.

The pesticide(s) may comprise one or more herbicide(s) and/or insecticide(s). As the skilled person will appreciate, a herbicide is a pesticide specific for plants, for example, weeds, while an insecticide is a pesticide specific for insects.

The one or more herbicides may comprise one or more of atrazine, 2,4-D, clopyralid, dicamba, glyphosphate, imazapyr, imazapic, metoalachlor, paraquat, picloram and triclopyr. In embodiments, the herbicide is glyphosphate and/or atrazine. One commercially available form of glyphosphate is Roundup™.

The one or more insecticide(s) may be selected from one or more organochloride(s), pyrethroid(s), organophosphate (s), Neonicotinoid(s), ryanoid(s), carbamate(s) and combinations thereof.

Various organochlorides are commercially available. These include, but are not limited to, Aldrin, Chlordane, Chlordecone, DDT, Dieldrin, Endosulfan, Endrin, Heptachlor, Hexachlorobenzene, Lindane (gamma-hexachlorocyclohexane), Methoxychlor, Mirex, Pentachlorophenol and TDE.

Organophosphates may include, but not necessarily be limited to, Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulfoton, Ethoprop, Fenamiphos, Fenitrothion, Fenthion, Fosthiazate, Malathion, Methamidophos, Methidathion, Mevinphos, Monocrotophos, Naled, Omethoate, Oxydemeton-methyl, Parathion, Parathion-methyl, Phorate, Phosalone, Phosmet, Phostebupirim, Phoxim, Pirimiphos-methyl, Profenofos, Terbufos, Tetrachlorvinphos, Tribufos and Trichlorfon.

Commercially available carbamates, which may be found in a body of water, may include one or more of Aldicarb, Bendiocarb, Carbofuran, Carbaryl, Dioxacarb, Fenobucarb, Fenoxycarb, Isoprocarb, Methomyl, Oxamyl, Propoxur and 2-(1-Methylpropyl)phenyl methylcarbamate.

Known pyrethroids include Allethrin, Bifenthrin, Cyhalothrin, Lambda-cyhalothrin, Cypermethrin, Cyfluthrin, Deltamethrin, Etofenprox, Fenvalerate, Permethrin, Phenothrin, Prallethrin, Resmethrin, Tetramethrin, Tralomethrin and Transfluthrin.

Exemplary neonicotinoids include, but are not necessarily limited to, Acetamiprid, Clothianidin, Dinotefuran, Imidacloprid, Nithiazine, Thiacloprid and Thiamethoxam.

Commercially available ryanoids include, but are not necessarily limited to, Chlorantraniliprole, Cyantraniliprole and Flubendiamide.

The one or more fertilisers may comprise one or more of nitrogen fertiliser(s), phosphate fertiliser(s), potassium fertiliser(s), compound fertiliser(s) and combinations thereof.

In embodiments, the one or more contaminants are selected from one or more of ibuprofen, acetaminophen, diclofenac, tramadol, naproxen, codeine, carbamazepine, gabapentin, erthryomycin, trimethroprim, glycosphosphate, gemfibrozil, metformin, glyburide and propranolol.

In embodiments, the one or more contaminants comprise or consist of ibuprofen, paracetamol, diclofenac, tramadol, naproxen, codeine, carbamazepine, gabapentin, erthryomycin, trimethroprim, glycosphosphate, gemfibrozil, metformin, glyburide, and propranolol.

The one or more contaminants may be selected from one or more of ibuprofen, acetaminophen, naproxen, tramadol, trimethoprim, erythromycin, carbamazepine, glyburide and gemfibrozil. In embodiments, the one or more contaminants may comprise or consist of ibuprofen, acetaminophen, naproxen, tramadol, trimethoprim, erythromycin, carbamazepine, glyburide and gemfibrozil.

In some embodiments, the pool of isolated *Daphnia* filter at least 50% of one or more analgesic(s) and/or one or more herbicides. Optionally, the pool of isolated *Daphnia* filters at least 60% or at least 65% of one or more analgesic(s) and/or one or more herbicides.

The pool of isolated *Daphnia* may filter at least 50% of one or more NSAIDs (non-steroidal anti-inflammatories) and/or one or more herbicides.

For example, the pool of isolated *Daphnia* may filter at least 50% of diclofenac and/or atrazine.

The pool of isolated *Daphnia* may filter at least 50% of one or more analgesic(s), optionally one or more NSAIDs, for example diclofenac, during one day in the body of water.

In embodiments, the pool of isolated *Daphnia* filters 100% of one or more analgesics. The one or more analgesic(s) may comprise or consist of NSAID(s), for example diclofenac.

The pool of isolated *Daphnia* may comprise *Daphnia* isolated from a polluted water source.

A polluted water source will be understood to be environmental water (i.e. water in a pond, lake, swamp, stream or river) which is not suitable for safe human consumption, industrial and/or domestic use. A polluted water source may be defined as a water source (i.e. environmental water) having a biochemical oxygen demand (BOD5 at 20° C.) without nitrification of over 25 mg/l $O_2$, optionally of over 50 mg/l $O_2$, further optionally of over 100, or over 200 mg/l $O_2$. Alternatively or in addition to, a polluted water source may be defined as having a chemical oxygen demand of over 125 mg/l $O_2$, optionally over 200 mg/l $O_2$, optionally over 40 mg/l $O_2$. In embodiments, a polluted water source is defined as having more than 100 mg/l, optionally more than 200 mg/l, optionally more than 500 or more than 1000 mg/l of suspended solids.

Optionally, a polluted water source may be defined as a water source that has received, or is receiving, raw sewage or partially treated sewage. A polluted water source may be defined as a water source which receives run-off from agricultural land and/or receives wastewater from industrial estates, and/or which receives run-off from roads and other constructed land.

The pool of isolated *Daphnia* may comprise or consist of multiple *Daphnia* species. In embodiments, the pool of isolated *Daphnia* comprise or consist of *Daphnia magna*.

In embodiments, the pool of isolated *Daphnia* comprises *Daphnia* from one particular genotype only. Alternatively, the pool of isolated *Daphnia* may comprise a plurality of different genotypes. Having a combination of different *Daphnia* genotypes effectively acts as a "cocktail" of different genotypes; this cocktail of genotypes provides genotypic variety which can lead to an increased efficiency of filtration. In addition, the genotypes can be tailored such that the pool of isolated *Daphnia* is particularly effective for a particular contaminant or combination of contaminants.

The pool of isolated *Daphnia* may comprise at least two, at least three, at least four, at least five, at least six, at least seven, at least eight, at least nine or at least ten different genotypes. In embodiments, the pool of isolated *Daphnia* comprises between five and 10 different genotypes.

The method may comprise a step of assessing the one or more contaminants in the body of water, such that the one or more contaminants are identified to select an optimal pool of isolated *Daphnia* for addition to the body of water to improve the water quality.

By "optimal population", this will be understood to refer to a pool of isolated *Daphnia* that is especially suitable for filtering the particular one or more contaminants, for example, they are more effective than other pools of isolated *Daphnia* at filtering the particular one or more contaminants.

Selection of an optimal population may comprise carrying out the method according to the third aspect below, wherein a body of water comprises one or more particular contaminants at a defined concentration, and it is determined which isolated *Daphnia* are particularly optimal for use in filtering the one or more contaminants.

According to a second aspect, there is provided a method of generating *Daphnia* for use in improving water quality, the method comprising providing a pool of isolated *Daphnia* and adding the pool of isolated *Daphnia* to a body of water comprising one or more contaminants, such that the *Daphnia* are exposed to the one or more contaminants. The pool of isolated *Daphnia* comprises *Daphnia* which have been resurrected from dormant *Daphnia*, for example, from dormant embryos or dormant eggs. The method further comprises increasing the level of the one or more contaminants to which the *Daphnia* are exposed, wherein *Daphnia* which remain viable after the level of the one or more contaminants has been increased are suitable for use in improving water quality.

As described herein, non-viable adult *Daphnia* can be distinguished from viable adult *Daphnia* by their swimming behaviour. Viable adult *Daphnia* freely move (swim) in a body of water. In contrast, non-viable adult *Daphnia* do not swim and sink to the bottom of a water body. The methods described herein may therefore comprise the removal of non-viable *Daphnia* using suitable means which are designed to capture the dead/non-viable *Daphnia* which sink within a body of water.

The pool of isolated *Daphnia* may comprise a library of isolated *Daphnia* samples. The term "library", as used herein, is understood to refer to a collection of different isolated *Daphnia* samples. The different isolated *Daphnia* samples may have different genotypes. In the context of the present invention, a "collection of different isolated *Daphnia* samples" refers to *Daphnia* samples (each sample comprising a plurality of *Daphnia*) that may have been isolated at different times, from different locations, and/or from different dormant egg banks. Each sample can relate to a different variable, such that different variables (e.g. different locations, different time points) of *Daphnia* can be compared to determine which sample is most suitable for use in improving water quality.

As described herein, the one or more contaminants may comprise one or more pharmaceutical product(s), pesticide (s), fertilizer(s), perfluorinated compound(s), fluorosurfactant(s) and/or suspended solids. The one or more contaminant may be one or more persistent contaminants, such as a POP. If there is/are one or more particular contaminants which is/are difficult to remove from water, or which are known to be present in water, for example wastewater, at high levels, then the method of the second aspect can be especially useful in focusing on increasing the level of such particular contaminant(s), such that *Daphnia* are generated which are capable of filtering such contaminant(s) to improve the water quality.

Through the use of increasing concentrations of the one or more contaminants and removing any *Daphnia* which become non-viable, or die, it is possible to obtain a pool of *Daphnia* which are adapted to withstand higher concentrations of contaminants. Such adapted pools of *Daphnia* may be of use where the initial concentration of said one or more contaminants is particularly high.

Alternatively, or in addition, the step of increasing the level of the one or more contaminants may comprise removing viable *Daphnia* from the body of water comprising one or more contaminants and adding the viable *Daphnia* to another body of water comprising one or more contaminants at an increased level compared to the level of one or more contaminants in the previous body of water. This step can be repeated as many times as necessary.

By retaining only the viable *Daphnia* and increasing the level of the one or more contaminants, this effectively selects for *Daphnia* capable of surviving in an increasing level of one or more contaminants, thereby generating a pool of *Daphnia* suitable for use in improving water quality. This enables the skilled person to generate a suitable pool of isolated *Daphnia*, for example, should a suitable pool not be available in an egg bank.

The step of increasing the level of the one or more contaminants can be repeated as many times as necessary, until a desired level of the one or more contaminants is reached. For example, this step can be performed one, two, three, four, five, six, seven, eight, nine, 10 or more times. In this way, a pool of isolated *Daphnia* can be generated which is suitable for improving water quality and is tailored to the particular needs of the water quality.

In some embodiments, the step of increasing the level of the one or more contaminants may be carried out once per generation (i.e. the average time taken from egg hatching to adult *Daphnia* being capable of reproducing), or longer, for example.

The method may further comprise culturing *Daphnia* identified as being suitable for use in improving water quality to increase the number of the selected *Daphnia*. Due to asexual/clonal reproduction, it is possible, under suitable conditions, to culture *Daphnia* indefinitely.

Culture of the *Daphnia* may comprise providing the *Daphnia* identified as being suitable for use in improving water quality with algae as a food source. In some embodiments, the *Daphnia* are cultured in medium comprising nitrogen, phosphorus, carbon, vitamins and oxygen. The *Daphnia* may be cultured in a bioreactor.

According to a third aspect, there is provided a method of screening for *Daphnia* for use in improving water quality, the method comprising: providing a population of isolated *Daphnia*; adding the population of isolated *Daphnia* to a body of water comprising one or more contaminants at a defined concentration, such that the *Daphnia* are exposed to the one or more contaminants at the defined concentration; and isolating viable *Daphnia* after a period of at least 1, 2, 3, 4, 5, 6, or 7 days. The isolated *Daphnia* comprises

*Daphnia* which have been resurrected from dormant *Daphnia*, for example, dormant embryos or dormant eggs.

It will be appreciated that *Daphnia* isolated in this manner may be of use in the methods of improving water quality as described herein.

The pool of isolated *Daphnia* may comprise a library of isolated *Daphnia* samples. In such embodiments, it will be appreciated that each sample may be added to a separate body of water comprising one or more contaminants at a defined concentration. Each separate body of water may comprise one or more contaminants at a different defined concentration. Each separate body of water may comprise one or more different contaminants to at least one other separate body of water.

By defined concentration, this will be understood to be a concentration selected by the user which is considered to be below at least one standard of water quality (for example the International Organization for Standardization (ISO) regulation of water quality in section 13.060 or the European Union Council Directive 91/271/EEC of 21 May 1991).

As described herein, the one or more contaminants may comprise one or more pharmaceutical product(s), pesticide (s), fertilizer(s), and/or suspended solids. The one or more contaminants may be one or more persistent contaminants, such as POPs.

In embodiments where the one or more contaminants comprise ibuprofen, the defined concentration of ibuprofen may be at least 9000 ng/L. When the one or more contaminants comprise acetaminophen, the defined concentration of acetaminophen may be at least 700 ng/L, optionally at least 710 or 720 ng/L. When the one or more contaminants comprises diclofenac, the defined concentration of diclofenac may be at least 50 ng/L, optionally at least 55 or at least 60 ng/L. In embodiments where the one or more contaminants comprise tramadol, the defined concentration of tramadol may be at least 305, at least 306, at least 308 or at least 310 ng/L. For naproxen, the defined concentration may be at least 83, at least 85, at least 90 or at least 95 ng/L. In embodiments where the one or more contaminants comprises codeine, the defined concentration of codeine may be at least 12, at least 140 or at least 150 ng/L. When the one or more contaminants comprises carbamazepine, the defined concentration of carbamazepine may be at least 650, at least 660 or at least 670 ng/L. For gabapentin, the defined concentration may be at least 9, at least 12 or at least 15 ng/L. When the one or more contaminants comprises erythromycin, the defined concentration of erythromycin may be at least 42, at least 43 or at least 45 ng/L. When the one or more contaminants comprises trimethoprim, the defined concentration may be at least 290 or at least 300 ng/L. For glycophosphates, the defined concentration may be at least 70 or at least 75 ng/L. For gemfibrozil, the defined concentration may be at least 520, at least 550 or at least 570 ng/L. In embodiments where the one or more contaminants comprises metformin, the defined concentration of metformin may be at least 500 ng/L, at least 550 ng/L or at least 600 ng/L. When the one or more contaminants comprises glyburide, the defined concentration of glyburide may be at least 180 or at least 200 ng/L. For propranol, the defined concentration may be at least 16, at least 17 or at least 18 ng/L.

The method may further comprise culturing *Daphnia* identified as capable of improving water quality to increase the number of the selected *Daphnia*.

According to a fourth aspect, there is provided a water quality improvement device for improving water quality, the water quality improvement device comprising a housing, the housing comprising *Daphnia*. In an embodiment, the *Daphnia* contained with the device may be identified by the method of the second or the third aspect. The *Daphnia* comprise *Daphnia* which have been resurrected from dormant *Daphnia*, for example, dormant embryos or dormant eggs.

The provision of a water quality improvement device provides a convenient form for users to carry out a method of improving water quality, since the device can simply be placed in a body of water which the user would like to increase the water quality of. For example, when the body of water comprises environmental water, for example, a lake, river, stream, pond or swamp, the water quality improvement device can simply be added to and removed from the body of environmental water. Thus, in the methods disclosed above, the *Daphnia* may be provided in a water quality improvement device as disclosed herein.

The housing may comprise a porous material which enables the flow of water through the device. It will be appreciated that while the pores are large enough to allow the flow of water, they are small enough that the *Daphnia* cannot escape from the device. This ensures that the device can conveniently be placed into and taken out of a body of water without requiring a step of removing any *Daphnia* from the water, since the *Daphnia* are always retained in the device.

As the skilled person will appreciate, a porous material is any material which comprises pores. In embodiments, the porous material comprises a mesh, optionally plastics or other polymer suitable mesh. The mesh may have a pore size of approximately 250 μm, 200 μm or 100 μm.

Conveniently, the *Daphnia* may be enclosed by the porous material such that the *Daphnia* are in the housing. In some embodiments, the porous material may be flexible, for example a plastic polymer. This allows the *Daphnia* to be retained by the porous material while being flexible enough to be placed and/or removed into/from a body of water to allow the water to pass through the device. In particular, it is important to retain the *Daphnia*, and to prevent dispersion of the *Daphnia* within the water, in order to enable removal of the one or more contaminants from the water. In addition, the device protects the *Daphnia* from being eaten by predators, particularly when the *Daphnia* are used in a natural body of water.

The skilled addressee may envisage many types of device which may be suitable. In one embodiment, an envisioned device may be in akin to an inverted frusto-conical like arrangement, in which the widest portion of the device is designed to point upwards and float at the surface of the body of water. The widest portion may also be open, so as to permit easy access to the *Daphnia*, in order to monitor their condition and/or remove portions as necessary. The narrower part of the conical portion will point downwards and be beneath the surface of the water. A filter and/or other means may be provided which is designed to collect any dead or non-viable *Daphnia* which descend by gravity. Such dead and/or non-viable *Daphnia* may easily be collected and may be done so without having to disturb or disrupt the viable *Daphnia* which continue to swim within the device.

The filter device may be reusable.

In embodiments, the filter device comprises a flotation apparatus. This enables the device to remain buoyant in a body of water. The flotation apparatus may comprise one or more hollow tubes. In embodiments, the housing of the filter device comprises one or more hollow tubes.

The filter device may comprise an anchor to retain the device in a position in a sample of water.

There is also provided use of the water quality improvement device according to the fourth aspect for filtering water.

Any of the features described herein (including any accompanying claims, abstract and drawings) may be combined with any of the above aspects in any combination, unless otherwise indicated.

DETAILED DESCRIPTION

The invention will now be described by way of example, and with reference to the following figures, in which:

FIG. 1 shows a step-by-step guide to the resurrection of *Daphnia magna*. Sediment from a natural freshwater habitat (A) is sampled with a piston corer (B). The sediment core (C) is sliced in incremental layers of 1 or 0.5 cm (D). Each layer of sediment is stored in a sample zip lock bag (E) in dark and cold conditions (4° C.). Each layer of sediment is weighed and sieved using geological sieves (1 mm and 125 μm mesh sizes stacked on each other, F). White background trays are used to isolate *Daphnia magna* dormant eggs encased into ephippia (G). Decapsulated dormant eggs (H) are transferred to Petri dishes and exposed to light and temperature stimuli to induce hatching. Hatchlings are transferred to separate jars (I) to establish isoclonal lines.

FIG. 2A shows the performance of 18 different genotypes of *Daphnia magna* resurrected from two pools (1960 and 1999) of a single lake sedimentary archive. Performance of each genotype is measured as fecundity following exposure to different dilutions of wastewater ranging between 20% and 100%. Fecundity is also measured in control conditions (C), consisting of clean borehole water. FIG. 2B shows population level performance measured as fecundity of the two *Daphnia magna* genotype pools. The pool of genotypes from the 1960s (black) has a significantly higher performance than the pool of genotypes from the 1999s (grey) (ANOVA, P<0.001).

Figure 3:
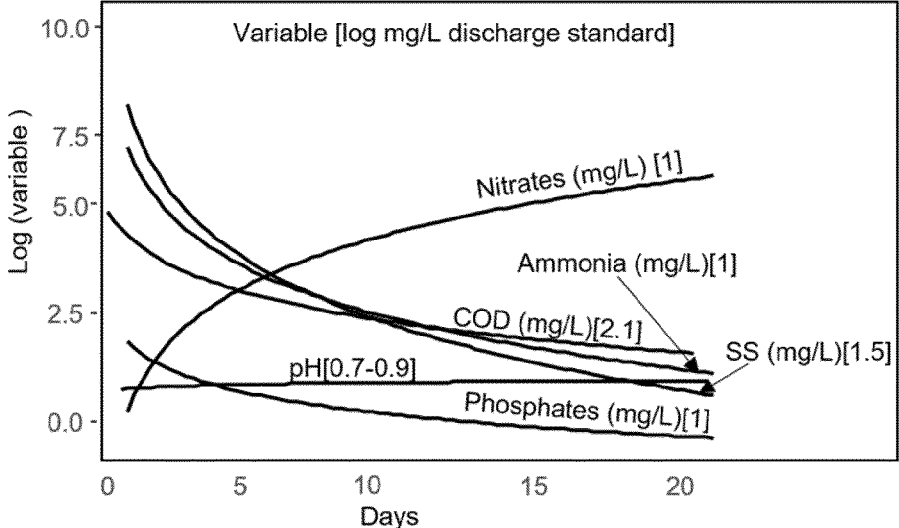

FIG. 3 shows the level of suspended solids (SS), chemical oxygen demand (COD), nitrates, phosphates, ammonia and pH in wastewater following exposure to *Daphnia magna* over 20 days. EU/UK discharge standards are in brackets for each parameter.

Figure 4:
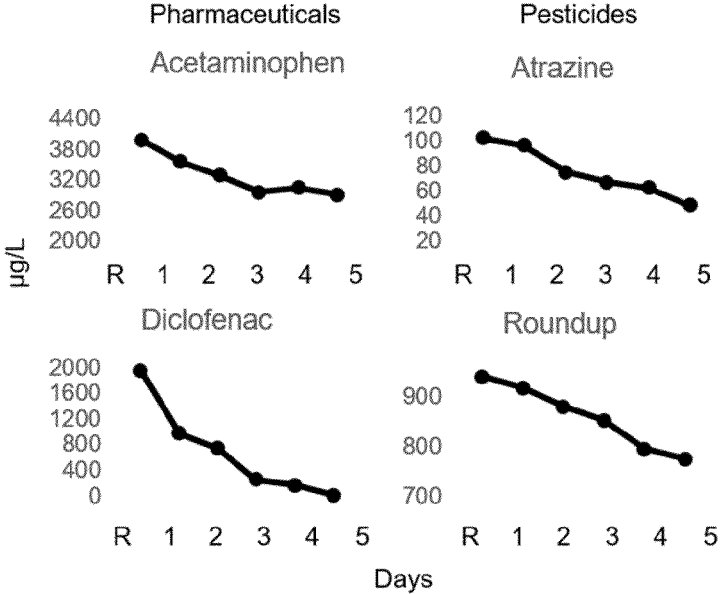

FIG. 4 shows the daily concentration of pharmaceuticals (Acetaminophen and Diclofenac) and pesticides (Atrazine and Roundup) measured in controlled laboratory conditions after exposure to *Daphnia magna* over five days. Concentrations are measured via mass spectrometry as compared to the initial concentration of the compound (R) representing the starting or reference point. The concentration at the reference point is prior to *Daphnia* introduction.

Figure 5:
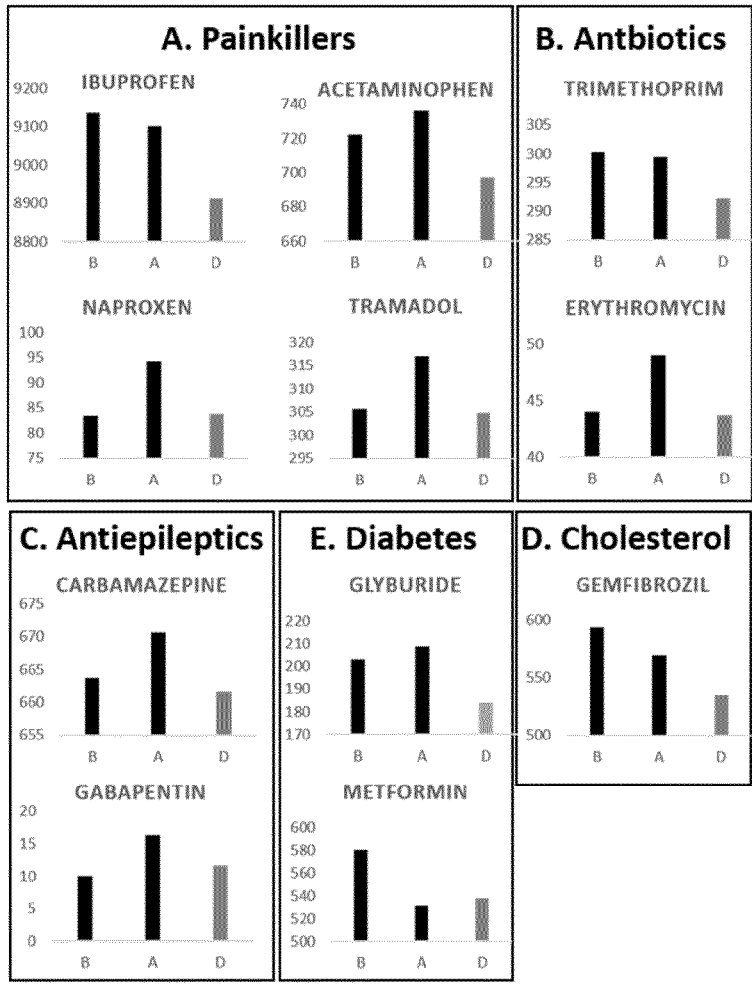

FIG. 5 shows removal efficiency of painkillers, antibiotics, antiepileptics, diabetes and cholesterol drugs from municipal wastewater by bacteria (B), algae (A) and *Daphnia magna* (D). *Daphnia* removes higher concentrations of these chemicals than bacteria and algae.

Figure 6:
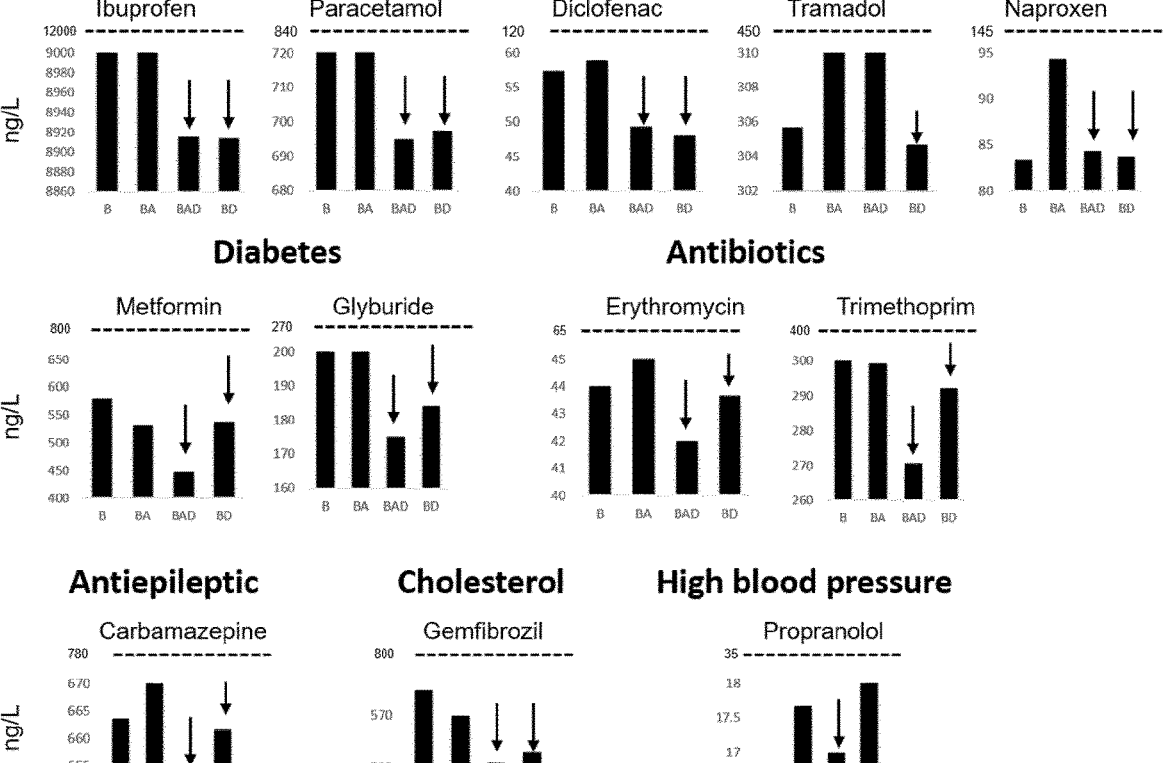

FIG. 6 shows the reduction in concentration of painkillers, antiepileptic, antibiotics, cholesterol, diabetes and high blood pressure drugs, as well as one pesticide (Roundup) from wastewater by bacteria (B; these are bacteria already present in the wastewater); bacteria and algae (BA); bacteria and *Daphnia magna* (BD); bacteria, algae and *Daphnia magna* (BAD). The comparative analysis of different biological agents shows that treatments in which *Daphnia* is included have higher efficiency removal.

Figure 7:
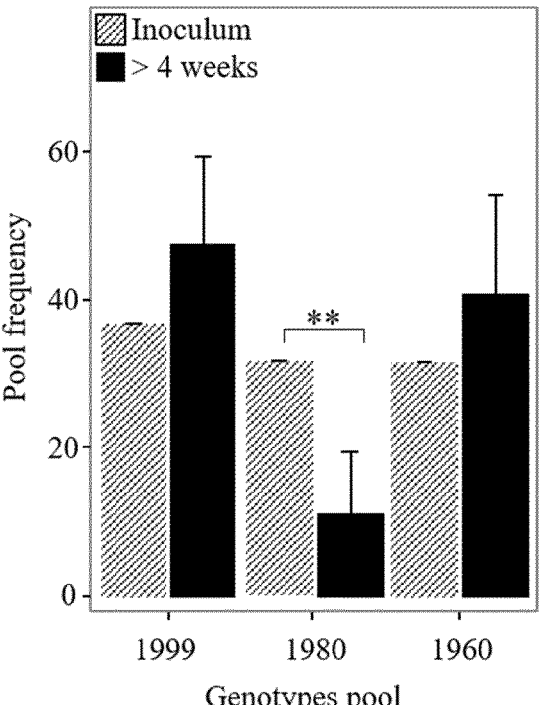

FIG. 7 shows the proportion of viable *Daphnia magna* genotypes (solid bars) from three pools resurrected from three time periods of the same biological archive and which experienced different levels of historical exposure to pesticides: 1999s, 1980s and 1960s. An identical number of genotypes from the three pools were exposed to high levels of the carbamate insecticide Carbaryl for four weeks. The hatched bars represent the starting proportion of each pool of genotypes inoculated in the experiment (inoculum). After four weeks the genotypes experimental enclosures were sampled and the genotypes characterised using molecular markers. The figure shows that the pools from 1999s and 1960s did not change significantly over the four weeks, whereas the pool from the 1980 suffered a significant decline (P<0.001).

Example 1 (FIG. 1)

A resurrection ecology method is used to revive *Daphnia* strains as described below, and as described in more detail in Cambronero and Orsini. (Cuenca Cambronero, M., Orsini, L. Resurrection of Dormant *Daphnia magna*: Protocol and Applications. *J. Vis. Exp.* (131), e56637, doi: 10.3791/56637 (2018)), which is herein incorporated by reference.

*Daphnia* are freshwater zooplankters present in the majority of lentic habitats. *Daphnia* species are either obligate asexual or cyclical parthenogens. *D. magna* is a cyclical parthenogen that reproduces clonally under favorable environmental conditions. When environmental conditions deteriorate, male production occurs and sexual recombination leads to the formation of fertilized eggs that enter a state of dormancy protected from the environment by a chitin case called ephippium. A proportion of these dormant eggs hatch when favorable environmental conditions return. However, a large proportion of the dormant egg bank never has a chance to hatch and thus build up biological archives over time. Dormant stages remain buried in the sediment of lakes and ponds and can be resurrected for the study of evolutionary dynamics over extended time periods. Because dormant eggs of *D. magna* are the result of sexual recombination, they are a good representation of the natural genetic diversity of the species. Moreover, they can be maintained via clonal reproduction in the laboratory. These characteristics provide the unique advantage of isogenic model organisms, while retaining the natural genetic diversity.

FIG. 1 shows a step-by-step guide to the resurrection of *Daphnia magna* dormant eggs. This is described in more detail as follows.

Sampling of Sediment Cores (A)

Sediment was sampled from Lake Ring in Denmark using a piston corer. This protocol used Big Ben (Patmore, I. R. et al. Big Ben: a wide-bore piston corer for multi-proxy palaeolimnology. *J Paleolimnol.* 51 (1), 79-86 (2014)), a core tube of approximately 1.5 m in length with an internal tube diameter of 14 cm. Big Ben consists of a piston on a rope and a corer head, to which rods are attached to drive the tube into the sediment. A core catcher aids the support of the core tube when full of sediment. To extrude the sediment, a framework keeps the core tube upright and stationary, and a modified bottle jack is used to push the piston upwards during the extrusion process. It will be appreciated that samples can be obtained from any lake or pond.

1. For shallow ponds of less than 1 m in depth, a plexiglass gravity corer of no more than 6 cm of diameter is manually pushed into the sediment.
2. For deep lakes (>6 m of depth), Livingston piston corers (Wright, H. E., Jr. A square-rod piston sampler for lake sediments. *J Sedimentary Petrology.* 37 975-976 (1967)) or single-drive Griffith sediment corers with the aid of an anchored pontoon boat are used. The Livingstone-type drive rod piston corer can be used in water up to about 30 m deep to collect successive one-meter drives of soft to consolidated lake sediment. The single-drive Griffith corer consists of a simple but robust core head that connects standard polycarbonate tubes to Livingstone drive rods. The corers are pushed into the sediment with the rods, and a piston provides the suction needed for the recovery of sediment.

3. For retrieving continuous, undisturbed cores, vibracoring is used. These corers work on a variety of water depths and can retrieve core samples of different lengths, depending on sediment lithology. Low amplitude vibration that is transferred from the vibracore head down through the attached barrel or core tube liquefies sediments, enabling the core barrel attached to the vibracore unit to penetrate into the liquefied sediments. Some vibracorers are small, lightweight, and portable, others are large heavy units that can only be deployed from large vessels. The choice of corers depends on the lithology of sediment.

The core was sliced horizontally in incremental layers of 1 cm or less using a flat metal surface. Sediment corers like the one used here are designed to reduce hydrostatic pressures at extrusion, reducing disturbance of the sediment layers. When other corers are used, the outer rind of each sediment layer may be removed with a cookie-cutter sort of blade to limit contamination among layers.

Each sediment layer was collected in a separate sampling bag, and stored in dark and cold (4° C.) conditions.

A minimum of 5 g of sediment was collected from all layers for radiometric dating.

Sieving of Sediment Layers

Each sediment layer was weighed using a precision scale for future reference. The surface area and weight was used to calculate the species density in the lake. Each sediment layer was sieved using two geological sieves piled on top of each other. The first sieve had a mesh size of 1 mm and separates clay, large invertebrates and particulate matter, e.g. seeds, plants, and insects, from the remainder of the sediment. The second sieve had a mesh of 125 μm and separates *D. manga* ephippia and small particulate from the remainder of the sediment. Small aliquots of the sediment fraction collected onto the 125 μm mesh sieve were transferred to a white background tray. Depending on the type of sediment, smaller or larger aliquots of sediment may be transferred at each time.

Small volumes (up to 200 mL) of medium were added to the sampling white tray to resuspend the transferred sediment fraction and facilitate eye spotting of ephippia. The medium used to resuspend the sediment can be dechlorinated tap water, borehole water, COMBO (Kilham, S. S., Kreeger, D. A., Lynn, S. G., Goulden, C. E., & Herrera, L. COMBO: a defined freshwater culture medium for algae and zooplankton. *Hydrobiologia.* 377 147-159 (1998)), or ADaM medium (Aachener Daphnien) (Klüttgen, B., Kuntz, N., & Ratte, H. T. Combined effects of 3,4-dichloroaniune and food concentration on life-table data of two related cladocerans, *Daphnia magna* and *Ceriodaphnia quadrangula. Chemosphere.* 32 2015-2028 (1996)). Hereafter, the term 'medium' will be used to refer to any or all of the listed solutions.

Decapsulation of Ephippia and Hatching

Individual ephippia were transferred (using a disposable Pasteur pipette or microdissection forceps) to Petri dishes filled with 10 mL of medium. At least one Petri dish was used per layer of sediment. Each ephipphia was decapsulated under a stereo microscope using microdissection forceps by forcing open the chitin case. The resting egg inner membrane was removed delicately, with attention paid to not disrupt the eggs, and they were then transferred to the Petri dish filled with medium using a Pasteur pipette. Decapsulation increases hatching success in *D. magna*; however, this is an optional step.

The decapsulated eggs were then exposed to a full spectrum long day photoperiod light (16:8 light:dark) and high temperature (20±1° C.) to induce hatching in a controlled temperature device (incubator) or room. Hatching occurs between 48 h and several weeks (up to four). In the absence of decapsulation, directly expose the ephippia to hatching stimuli (long day photoperiod light (16:8 light:dark) and high temperature (20±1° C.).

Establishing Isoclonal Lines of *Daphnia magna*

Isoclonal lines were established from single hatchlings by transferring individual *D. magna* after decapsulation to separate jars filled with 200 mL of medium using a disposable Pasteur pipette. Each individual is genetically distinct, being the result of sexual recombination. Isoclonal lines were maintained indefinitely in stock conditions consisting of 10±1° C., 16:8 light:dark regime, fed weekly with 0.2 mg C/L of *Chlorella vulgaris* or other green algae (e.g., *Scenedesmus obliquus*). The medium was renewed every third week. Stock conditions may change with temperature, feeding regimes, and species.

Figure 2:
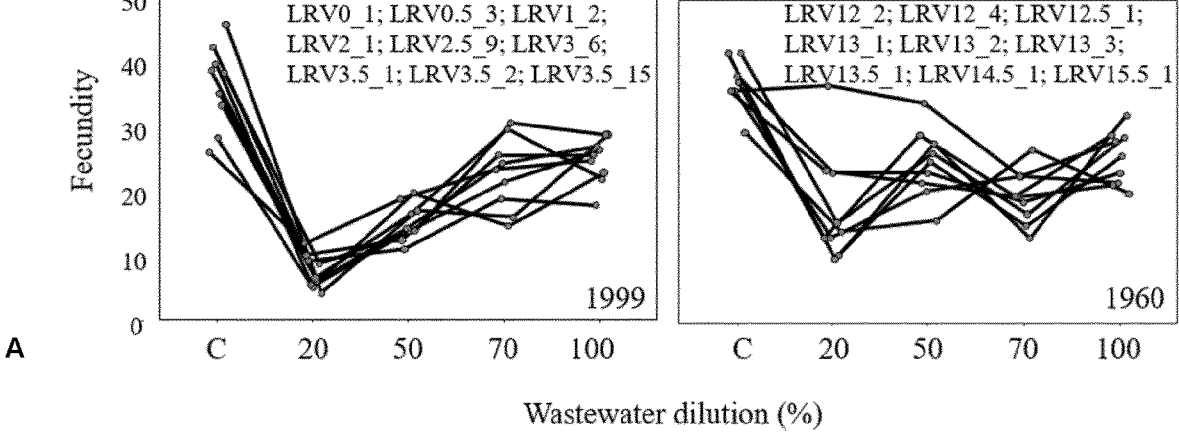
Figure 2:
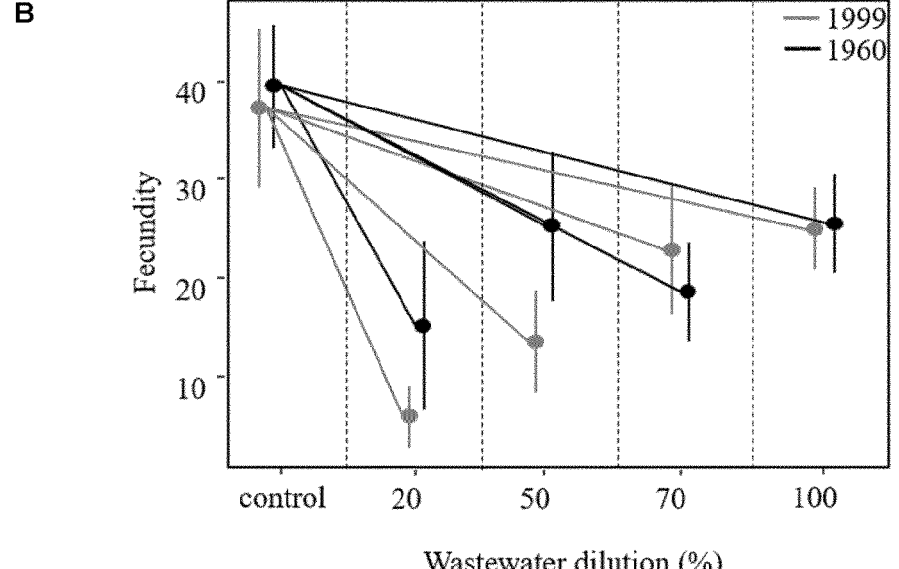

Example 2 (FIG. 2)

*Daphnia magna* performance in secondary treatment municipal wastewater was quantified as fecundity. This is indicative of *Daphnia* being able to thrive in wastewater. The expectation is that higher performance is associated with higher fecundity. The municipal wastewater contains high loads of organic matter, phosphates, nitrates, ammonia and bacteria (high chemical and biological oxygen demand) as shown in Example 3 (FIG. 3). In addition, this wastewater is expected to contain pesticides and pharmaceuticals, even though we did not measure them in this Example. Examples discussing chemical characterization and quantification of chemical contaminants in tertiary treated wastewater are presented in Examples 4-6 below.

Methods

Individual genotypes of *Daphnia* from two different pools resurrected from the 1999s and the 1960s (total of 18 genotypes), using the resurrection ecology approach described in Example 1, were exposed to dilutions of secondary treatment municipal wastewater, ranging from 20% to 100%. The pool of genotypes from the 1960s was historically exposed to sewage, whereas the pool of genotypes from the 1999s were exposed to run-off from agricultural land use. The two pools were tested to determine whether prior exposure to sewage equated to superior performance. The genotype fecundity, measured as the total number of offspring per individual genotype summing first and second brood, was quantified in different wastewater dilutions and in control conditions (C) consisting of borehole water used as a reference. Fecundity is quantified by counting the number of juveniles produced by each genotype within a life cycle, generally lasting 21 days (Cambronero Cuenca M. et al., Nature Scientific Reports, 2018, 8: 17572).

Prior to starting the exposure of individual genotypes to secondary treatment municipal wastewater, the genotypes were maintained for two generations in common garden conditions (16:8 light:dark regime, 16±1° C. and fed 0.8 mg Carbon/L of *C. vulgaris* daily) to reduce interference from maternal and grandmaternal effects. In this phase, the genotypes were synchronized to reproduce at the same time. After two generations in these conditions, 24-48 hour old individual juvenile clones from the second or following broods or each genotype were randomly assigned to the experimental dilutions of wastewater or the control consisting of borehole water. Fecundity, consisting of the sum of juveniles from first and second brood, was quantified for each genotype. The average pool performance-average fecundity across genotypes of the same pool—was also calculated at different dilutions of wastewater and in control conditions (borehole water).

Results

FIG. 2A shows the performance of individual genotypes in the pools from 1999 and 1960 in different dilutions of wastewater (i. e. 20%, 50%, 70%, 100%) and in control conditions (C, borehole water). In control conditions, the fecundity of all genotypes is comparable between the pools from 1999 and 1960, and higher than in any of the wastewater dilutions. The fecundity of both pools is lowest at 20% dilution, likely because of very low nutrient levels. However, it is lower in the 1999 pool than in the 1960 pool. The fecundity increases with decreasing dilution of wastewater. These results show that *Daphnia* can thrive in secondary treatment wastewater, including in undiluted water.

Pool level performance averaging the fecundity across genotypes of the same pool was then considered. The pool of genotypes from the 1960s (black lines) has a significantly higher fecundity than the pool of genotypes from the 1999s (grey lines) (ANOVA, P<0.001). This indicates that the *Daphnia* pool from 1960 has higher performance than the pool from 1999, likely because the 1960 pool has been preconditioned to sewage, having been historically exposed to sewage inflow from a municipal wastewater plant.

Example 3 (FIG. 3)

In this Example, the efficiency of *Daphnia magna* in improving wastewater quality standards was tested by measuring parameters commonly used by wastewater companies and dictated by regulations.

Methods

Nitrogen ammonia, nitrate, Chemical Oxygen Demand (COD), total phosphates (TP) and suspended solids (SS) were quantified twice a week over a period of 21 days to assess the efficiency of *Daphnia* in reducing water quality parameters to the discharge standards, using HACH DR/820/DR850/DR890 colorimeter instrument and following the manufacturer instructions (HACH, DR/820/DR850/ DR890 colorimeter instrument manual, 2013). Nitrogen ammonia was measured using the salicylate method (HACH10031). Nitrates were measured using the Cadmium reduction colorimeter method (HACH 8039) using powder pillows. COD was measured using the digestor method (HACH 8000). TP was quantified with the Molybdovanadate method with persulfate digestion (HACH 10127). pH was measure with standard bench pH meter (Orion Start A211). SS were quantified using the Photometric method (HACH 8006). These experiments were conducted on tertiary treated wastewater and used pools of genotypes.

Results

FIG. 3 shows the level of suspended solids, chemical oxygen demand, nitrates, phosphates, ammonia and pH in waste water exposed to *Daphnia* over 20 days. Except for nitrates and pH, which did not change significantly over time, the addition of *Daphnia* to the waste water decreased the other parameters level to the discharge standards dictated by EU and UK regulation. These data show that *Daphnia* can be used to improve water quality by reducing suspended solids, phosphates, ammonia and chemical oxygen demand.

Example 4 (FIG. 4)

The efficiency of *Daphnia magna* in removing ecologically-relevant concentrations of pesticides and pharmaceuticals from water was tested in controlled laboratory conditions, in which known concentrations of chemicals were added to borehole water. *Daphnia magna* was kept in this borehole with chemicals for five days and the concentration of the chemicals was measured daily to assess the removal efficiency.

Methods

Paracetamol (6 mg/L), also known as acetaminophen, a common painkiller and diclofenac (2 µg/L), an anti-inflammatory drug, were used. Moreover, common pesticides, such as atrazine (100 µg/L) and Roundup (Bayer, 1 mg/L) were studied over five days.

A single genotype of *Daphnia magna* was used in these experiments. Ultra-performance liquid chromatography-high resolution mass spectrometry (UPLC/MS) was used to quantify the daily concentrations of pharmaceuticals and pesticides in the water samples after removing *Daphnia*. Water samples spiked with known concentrations of chemicals were prepared using solid-phase methanol extraction following Anastassiades et al. (Journal of AOAC International Main, 2003, 86, p. 412-431).

Results

FIG. 4 shows that *Daphnia magna* reduces the concentration of two exemplary pharmaceuticals, paracetamol and diclofenac, and two exemplary pesticides, atrazine and Roundup, in water. A reduction in concentration is evident for each of the compounds after the *Daphnia* has been in the water for at least 24 hours (day 1 in FIG. 4), compared to a reference point (R) prior to the addition of *Daphnia* to the water. The concentration of each of the compounds continues to decline 2, 3, 4 and 5 days after the addition of the *Daphnia* (FIG. 4).

Paracetamol (which may otherwise be referred to as acetaminophen), is a known painkiller. The concentration of paracetamol at day 3 (2900 µg/L) was reduced to 27% of the starting concentration (of 4000 µg/L).

An 84% reduction in the concentration of the pharmaceutical product Diclofenac, a known NSAID (non-steroidal anti-inflammatory drug), was observed after the *Daphnia* had been in the water sample containing the Diclofenac for 3 days. After 5 days (so 4 days of the *Daphnia* being in the water), the Diclofenac had been completely removed from the water such that the concentration was 0 µg/L.

Atrazine and Roundup are commercially available pesticides. By day 5 (so 4 days after the addition of the *Daphnia*), the concentration of atrazine was 36% of the initial concentration. After 5 days, the concentration of Roundup had reduced to 21% of the initial concentration. These results show that *Daphnia* is efficient in absorbing pesticides and pharmaceuticals from water.

Example 5 (FIG. 5)

The efficiency of *Daphnia* to remove mixture of chemicals from tertiary treatment municipal wastewater was tested against algae and bacteria, commonly biological agents in wastewater treatment (e.g. activate sludge and reed beds).

Method

The experiments were conducted on tertiary treatment wastewater transported to the laboratory. The bacteria used in this experiment were the ones naturally occurring in wastewater. Hence, no external agent was added to the wastewater. The algal species *Chlorella vulgaris*, a common green algae, was used in this experiment and obtained from a laboratory culture. A pool of 20 genotypes of *Daphnia magna* was used in this Example. Prior to starting the exposure to tertiary wastewater, they were maintained for two generations in common garden conditions (16:8 light: dark regime, 16±1° C. and fed 0.8 mg Carbon/L of *C. vulgaris* daily) to reduce interference from maternal and grandmaternal effects. In this phase, the 20 genotypes were synchronized to reproduce at the same time. After two generations in these conditions, 24-48 hour old replicated clonal lines from the second or following broods were used in the exposures. Three replicated aquaria filled with wastewater were used for each biological agent: bacteria, algae and *Daphnia*. Wastewater samples from each aquarium were collected at day 3 after inoculation and screened with Ultra-performance liquid chromatography-high resolution mass spectrometry (UPLC/MS) to quantify pharmaceuticals and pesticides.

Results

FIG. 5 shows the concentration of various painkillers, antibiotics, antiepileptics, diabetes medications and cholesterol medications in municipal waste water following three days exposure to bacteria (B), algae (A) or *Daphnia* (D).

In particular, the concentrations of the painkillers ibuprofen, acetaminophen, naproxen and tramadol, the antibiotics trimethoprim and erythromycin the antiepileptic drug carbamazepine, the diabetic medication glyburide and the cholesterol-lowering medication gemfibrozil were measured.

For all types of medication tested, *Daphnia* were generally better than bacteria or algae at reducing the concentration of the pharmaceutical in wastewater. Occasionally, they were as good as algae (e.g. metformin). These results show that *Daphnia* is more efficient than bacteria and algae in removing mixture of chemicals from wastewater.

Example 6 (FIG. 6)

The efficiency of *Daphnia magna* combined with other biological agents was tested to reduce mixtures of pharmaceuticals in wastewater. Bacteria (B), bacteria and algae (BA), bacteria and *Daphnia* (BD), bacteria, algae and *Daphnia* (BAD) combinations were tested.

Method

The experimental methods were the same as in Example 5. The experiments were conducted on tertiary treatment wastewater transported to the laboratory. The bacteria used in this experiment were the ones naturally occurring in wastewater. Hence, no external agent was added to the wastewater. The algal species *Chlorella vulgaris*, a common green algae, was used in this experiment and obtained from a laboratory culture. A pool of 20 genotypes of *Daphnia magna* was used in this Example. Prior to starting the exposure to tertiary wastewater, they were maintained for two generations in common garden conditions (16:8 light: dark regime, 16±1° C. and fed 0.8 mg Carbon/L of *C. vulgaris* daily) to reduce interference from maternal and grandmaternal effects. In this phase, the 20 genotypes were synchronized to reproduce at the same time. After two generations in these conditions, 24-48 hour old replicated clonal lines from the second or following broods were used in the exposures. Three replicated aquaria filled with wastewater were used for each biological agent and combination thereof: Bacteria (B), bacteria and algae (BA), bacteria and *Daphnia* (BD), bacteria, algae and *Daphnia* (BAD). Wastewater samples from each aquarium were collected at day 3 after inoculation and screened with Ultra-performance liquid chromatography-high resolution mass spectrometry (UPLC/MS) to quantify pharmaceuticals and pesticides.
Results FIG. 6 shows the reduction of 13 pharmaceuticals naturally occurring in wastewater after exposure to Bacteria (B), bacteria and algae (BA), bacteria and *Daphnia* (BD), bacteria, algae and *Daphnia* (BAD): paracetamol, carbamazepine, erythromycin, trimethoprim, gemfibrozil and glyburide. For all of the compounds, it was observed that combinations in which *Daphnia* was present (algae, bacteria and *Daphnia* or bacteria and *Daphnia*) was more effective than bacteria alone or algae and bacteria at reducing the concentration of chemical mixtures in wastewater. These results show that *Daphnia* combined with algae and bacteria, which naturally occur in tertiary treated water, are highly efficient in removing chemical mixtures from wastewater (arrows in FIG. 6).

Example 7 (FIG. 7)

The ability to thrive of different *Daphnia magna* genotype pools resurrected from 1999, 1980, and 1960, was tested in presence of high concentrations of the carbamate insecticide Carbaryl (10 µg/L). Carbamate pesticides have been used at high levels since the 1970s, and so carbamate pesticides represent a common contaminant to current wastewater.
Methods The three genotype pools were exposed to high concentrations of the carbamate insecticide Carbaryl in replicated large aquaria of 10 L. The aquaria contained borehole water to which a known concentration of Carbaryl was added. Each pool comprised different genotypes but the number of individuals in each pool was identical.

Prior to the exposure, the genotypes were individually cultured for two generations in the following conditions to control for maternal effects and synchronize reproduction: 20° C.; long photoperiod (16:8 light:dark regime); feed daily with 0.8 mg Carbon/L of *C. vulgaris*; medium was renewed every second day. After this phase, five 24-48 h old juveniles from the second brood of the third generation from 7 genotypes of each pool were randomly assigned to three replicated 10 L aquaria resulting in a total of 105 animals per aquarium (5 juveniles×7 genotypes×3 pools). The aquaria were then exposed to Carbaryl for four weeks (3 clonal generations). To simulate population dynamics that *Daphnia* may encounter in the natural environment (e.g. mortality by competition and predation), 10% (1 L) of the volume was culled from each aquarium on day 10, 17 and 24, after thorough mixing, thereby removing a portion of medium and a random number of individuals collected in the culled medium. The volume of culled medium was replaced with the same volume of fresh medium and a new pulse of Carbaryl as per methods described in Cambronero et al 2018, Scientific Reports.

At the end of the fourth week, 10% of the volume of each aquarium was sampled and 32 individual animals were randomly isolated from this volume by using a paintbrush. They were then flash frozen in liquid nitrogen and their genetic fingerprint characterised using microsatellite markers (highly repetitive regions of the genome that provide a unique multilocus fingerprint for each genotype). A panel of 13 polymorphic microsatellites arranged in two multiplexes (M01 and M05) was used. M01 comprised loci: B50, B64, B45, B30, B107, B008, B96 and B74. M05 comprised loci: B87, A002, B52, B180 and B33. Their sequences and primer information is available in Orsini, Spanier and De Meester, 2012; Molecular Ecology 21: 2160-2175. Genomic DNA was extracted from single individuals using AGENCOURT® DNAdvance (Beckman Coulter) following the manufacturer instructions. The DNA extracted from single *Daphnia* individuals randomly sampled from the aquaria after 4 weeks was amplified with the two multiplexes using the following PCR cycling conditions: an initial denaturation step of 15 min at 95° C. was followed by 30 cycles of 94° C. for 30", 1.5 min at the annealing 54° C. and 1.5 min at 72° C. A final extension step of 30 min at 60° C. The obtained PCR fragments were genotyped on an AB13032 sequencer. Fragment analysis of the genotyped PCR products was conducted with Genemapper (Thermo Fisher Scientific) using LIZ500 (Thermo Fisher Scientific) as size standard.

The initial occurrence of each pool of genotypes was then compared to the random subset of animals sampled at the end of the experiment and genetically fingerprinted. This allowed to quantify changes in the occurrence of pool of genotypes from the three initially equally inoculated three pools. Changes in the occurrence of each pool of genotypes between the inoculum and the end of the experiment were quantified with a chi-squared test using the "stats" package in R v. 3.3.3. A non-significant change in pool frequency after four weeks of exposure to Carbaryl indicates that the pool was not affected by the chemical and maintained a presence similar to the initial inoculum. Conversely, a significant decrease or increase in frequency as compared to the initial inoculum indicates a negative or positive effect on the pool, respectively.
Results FIG. 7 shows the change in occurrence of genotypes in each of the three pools (solid bars) after four weeks exposure to Carbaryl as compared to the initial inoculum (hatched bars), which was identical across the three pools. The results show that whereas the 1999 and the 1960 pools did not experience a significant change in the number of genotypes, the 1980 pool experienced a significantly decrease in the number of genotypes and almost disappeared. These results show lower viability of the 1980 pool in presence of Carbaryl. Conversely, they show that the 1999 and 1960n pools will thrive in high Carbaryl. This Example shows how to screen for suitable *Daphnia* genotypes and tailor the genotypes to be used to the contaminants present in a certain body of water.

The invention claimed is:

1. A water quality improvement device for improving water quality of a body of water, the water quality improvement device comprising:

a housing comprising *Daphnia*, wherein the *Daphnia* comprise at least one *Daphnia* genotype which has been resurrected from dormant *Daphnia* eggs obtained from 1960 or earlier, and a filter for collecting and removing dead or non-viable *Daphnia*, wherein:

the housing comprises a porous material which enables a flow of water from the body of water through the water quality improvement device to expose the *Daphnia* to one or more contaminants within the body of water, the porous material being configured with pores that are large enough to allow the flow of water, but small enough such that the *Daphnia* cannot escape from the water quality improvement device, and the water quality improvement device has a frusto-conical arrangement, with a widest portion of the device designed to point upwards and float at a surface of the body of water, with a narrower part of the conical portion pointing downwards and beneath the surface of the water, and configured such that the filter will collect any dead or non-viable *Daphnia* which descend by gravity, whereby the water quality improvement device is configured to retain the *Daphnia* within the water quality improvement device, and the at least one *Daphnia* genotype has been selected for its ability to be resistant to, and to be capable of absorbing and retaining, one or more of the contaminants within the body of water.

2. The water quality improvement device according to claim 1, wherein the porous material comprises a mesh having a pore size that is less than or equal to 250 μm.

3. The water quality improvement device according to claim 1, wherein the one or more contaminants are selected from the group consisting of pharmaceutical agent(s), pesticide(s), fertilizer(s), herbicides, perfluorinated compound (s), fluorosurfactant(s) and suspended solids.

4. The water quality improvement device according to claim 3, wherein the one or more pharmaceutical agent(s) are selected from the group consisting of an antibiotic, a chemotherapy agent, a hormone, an analgesic, an antipyretic, an antiepileptic, an anti-diabetic, a cholesterol-lowering agent and an antidepressant.

5. The water quality improvement device according to claim 1, wherein the at least one *Daphnia* genotype has been resurrected from dormant *Daphnia* eggs obtained from prior to the 1960s.

6. The water quality improvement device according to claim 1, wherein the widest portion is open.

* * * * *